United States Patent [19]

Park

[11] Patent Number: 5,542,262
[45] Date of Patent: Aug. 6, 1996

[54] APPARATUS FOR CONTROLLING KIMCHI STORAGE TEMPERATURE IN REFRIGERATOR

[75] Inventor: Chan Y. Park, Kyungsangnam-Do, Rep. of Korea

[73] Assignee: Goldstar Co., Ltd.

[21] Appl. No.: 393,552

[22] Filed: Feb. 23, 1995

[30] Foreign Application Priority Data

Feb. 23, 1994 [KR] Rep. of Korea .................. 3214/1994

[51] Int. Cl.$^6$ .......................... F25B 29/00; F25D 17/04
[52] U.S. Cl. .................. 62/229; 62/157; 62/187; 165/918; 165/263; 99/468; 99/480; 99/486; 426/231
[58] Field of Search ................... 62/229, 187, 157, 62/231, 408, 414, 440, 441; 165/12, 30, 63, 918; 99/468, 470, 480, 483, 486; 236/49.3, 46 R, 46 F, 47; 426/7, 61, 231

[56] References Cited

U.S. PATENT DOCUMENTS

| | | | |
|---|---|---|---|
| 5,142,929 | 9/1992 | Chun | 99/468 |
| 5,190,096 | 3/1993 | Taniguchi et al. | 165/30 X |
| 5,351,745 | 10/1994 | Park | 165/30 |
| 5,398,599 | 3/1995 | Woo | 62/187 X |
| 5,424,210 | 6/1995 | Bae et al. | 99/468 X |
| 5,458,186 | 10/1995 | Lee et al. | 99/483 X |
| 5,476,672 | 12/1995 | Kim | 426/231 |
| 5,477,915 | 12/1995 | Park | 165/30 |

*Primary Examiner*—Harry B. Tanner
*Attorney, Agent, or Firm*—Fliesler, Dubb, Meyer & Lovejoy

[57] ABSTRACT

An apparatus for controlling a kimchi storage temperature in a refrigerator such that it is equal to the atmospheric temperature in the winter season. The control apparatus includes a chaos signal pattern storing unit for storing a chaos signal pattern corresponding to an atmospheric temperature variation pattern, and a microprocessor for fetching a chaos signal value previously stored in the chaos signal pattern storing unit and comparing a sensing signal value indicative of a temperature of a kimchi seasoning chamber equipped in the refrigerator with the fetched chaos signal value, and controlling the kimchi seasoning chamber temperature on the basis of the result of the comparison.

1 Claim, 7 Drawing Sheets

APPARATUS FOR CONTROLLING KIMCHI STORAGE TEMPERATURE IN REFRIGERATOR

BACKGROUND OF THE INVENTION

1. Field of the Invention

The present invention relates to an apparatus for controlling a kimchi storage temperature in a refrigerator, and more particularly to an apparatus for controlling a kimchi storage temperature in a refrigerator such that it is equal to the atmospheric temperature in the winter season.

2. Description of the Prior Art

In a general refrigerator, kimchi is stored at a low temperature of, for example, about 3° C. after being seasoned by a kimchi seasoning heater equipped in the refrigerator. Due to the storage temperature, the kimchi is continuously subjected to a low temperature seasoning. Where the amount of kimchi being stored is large, however, such a continued low temperature seasoning may result in an acidification of the kimchi before the kimchi is completely consumed.

SUMMARY OF THE INVENTION

Therefore, an object of the invention is to provide an apparatus for controlling a kimchi storage temperature in a refrigerator such that it is equal to the atmospheric temperature in the winter season.

In accordance with the present invention, this object can be accomplished by providing an apparatus for controlling a kimchi storage temperature in a refrigerator, comprising: chaos signal pattern storing means for storing a chaos signal pattern corresponding to an atmospheric temperature variation pattern; and a microprocessor for fetching a chaos signal value previously stored in the chaos signal pattern storing means and comparing a sensing signal value indicative of a temperature of a kimchi seasoning chamber equipped in the refrigerator with the fetched chaos signal value, and controlling the kimchi seasoning chamber temperature on the basis of the result of the comparison.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 1:
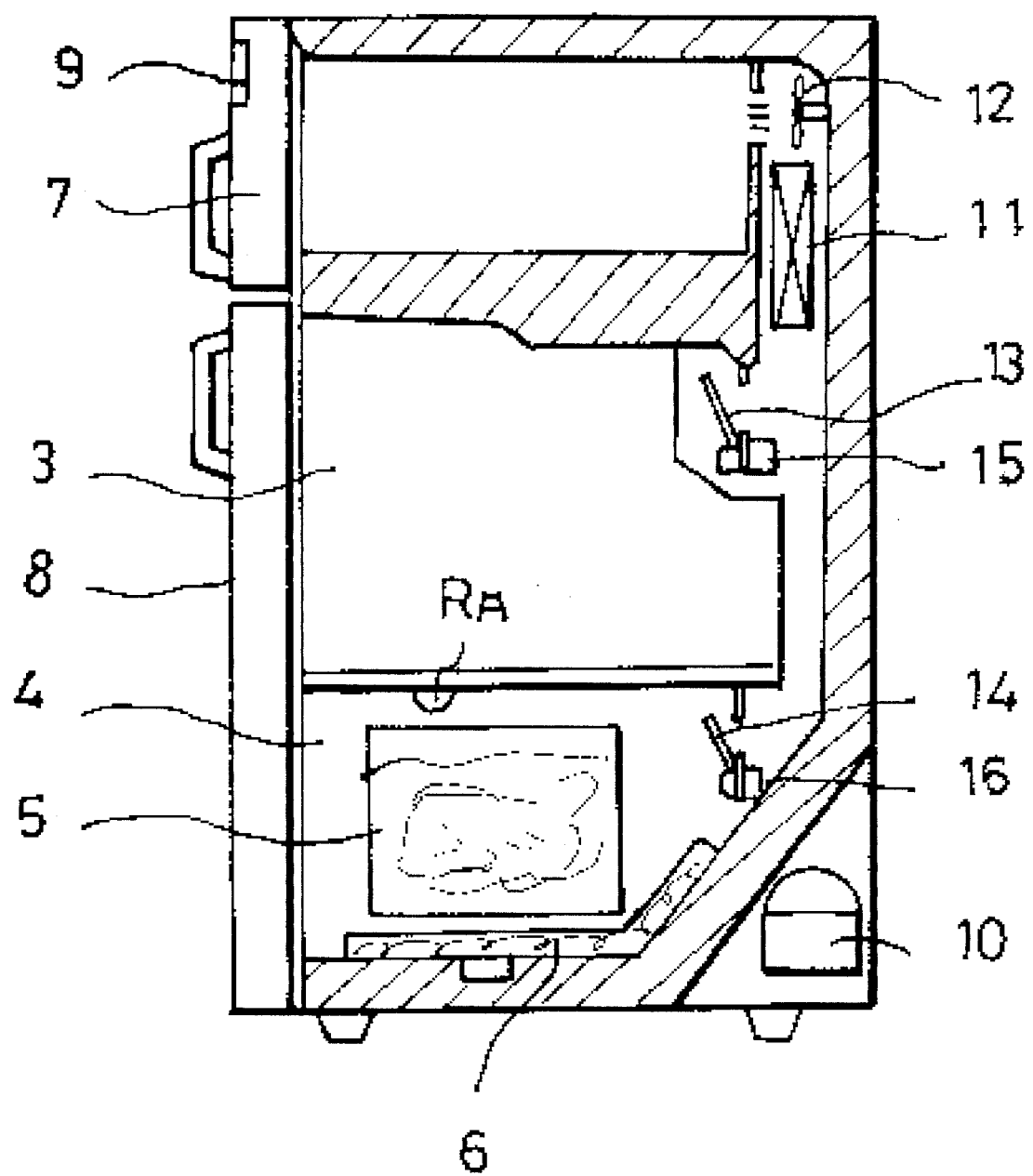
FIG. 1 is a sectional view of a refrigerator to which an apparatus for controlling a kimchi storage temperature in accordance with the present invention is applied.

Referring to FIG. 1, there is illustrated a refrigerator to which an apparatus for controlling a kimchi seasoning temperature in accordance with the present invention is applied. As shown in FIG. 1, the refrigerator includes a refrigerator body 1 having an upper freezing chamber 2, an intermediate refrigerating chamber 3 and a lower kimchi seasoning chamber 4. The lower kimchi seasoning chamber 4 is adapted to receive a kimchi box 5 for seasoning and storing kimchi. Beneath the kimchi seasoning chamber 4, a kimchi seasoning heater 6 is disposed. A freezing chamber door 7 is attached to the refrigerator body 1 to open and close the freezing chamber 2. To the refrigerator body 1, a refrigerating chamber door 8 is also attached to open and close the refrigerating chamber 3 and the kimchi seasoning chamber 4. A display unit 9 is disposed on a predetermined portion of the outer wall of the freezing chamber door 7 so as to display a current operation of the refrigerator. The refrigerator further includes a compressor 10 installed at the rear lower portion of the refrigerator body 1 and adapted to compress a refrigerant gas, an evaporator 11 installed at the rear upper portion of the refrigerator body 1 and adapted to expand the refrigerant gas compressed in the compressor 10 and thereby generate a cold air, a cooling fan 12 adapted to blow the cold air generated by the evaporator 11 to various pans of the refrigerator, and a pair of dampers 13 and 14 adapted to control the cold air introduced in the refrigerating chamber 3 and the kimchi seasoning chamber 4, respectively. A pair of damper motors 15 and 16 are also provided to control the opening and closing operations of the dampers 13 and 14, respectively.

Generally, the kimchi seasoning chamber 4 is disposed in one side of a vegetable chamber (not shown) for storing vegetables. Attached to the display unit 9 is a temperature sensor (not shown) adapted to sense an ambient temperature around the refrigerator. Attached to the upper surface of the kimchi seasoning chamber 4 is a temperature sensor RA adapted to sense the temperature of the kimchi seasoning chamber 4.

Figure 2:
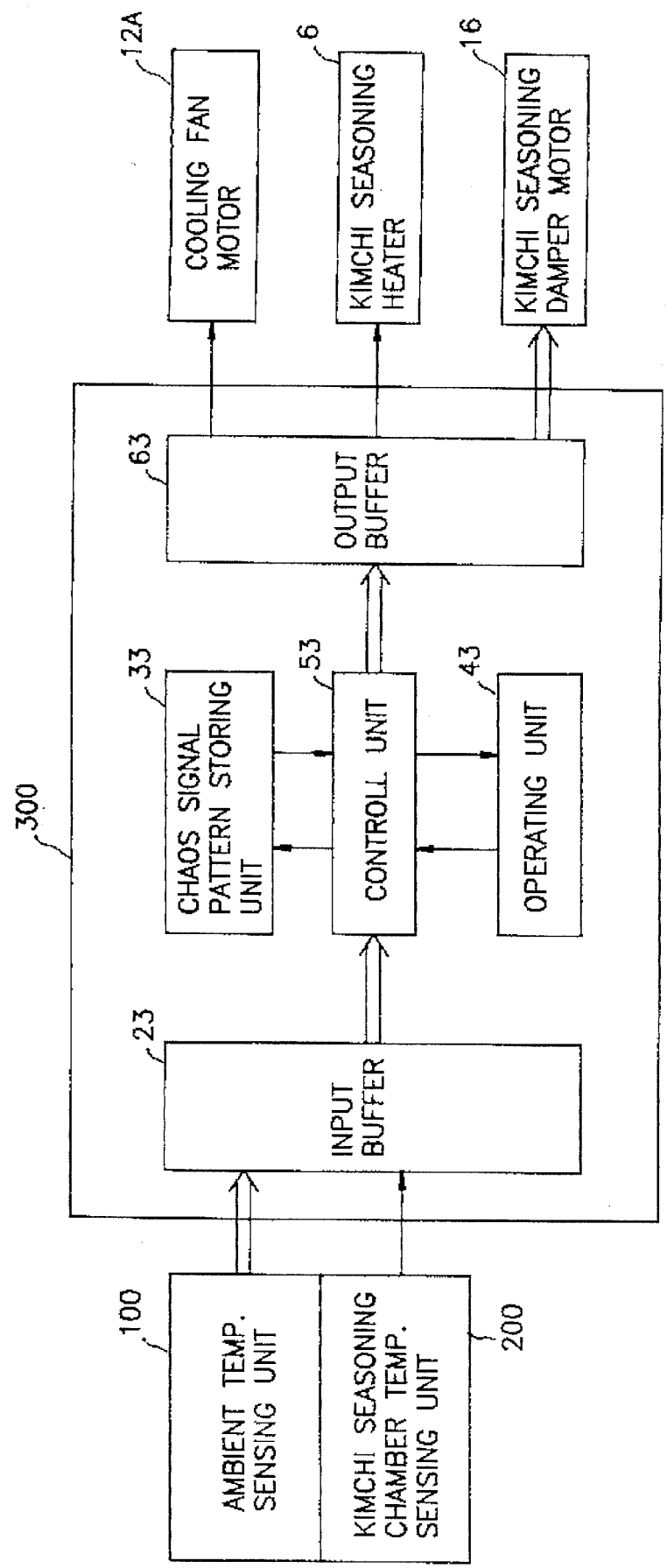
FIG. 2 is a block diagram of the control apparatus in accordance with the present invention.

FIG. 2 is a block diagram illustrating the control apparatus in accordance with the present invention. As shown in FIG. 2, the control apparatus includes an ambient temperature sensing unit 100 for sensing the ambient temperature around the refrigerator and outputting a signal indicative of the sensed ambient temperature, a kimchi temperature sensing unit 200 for sensing the temperature of the kimchi seasoning chamber 4 and outputting a signal indicative of the sensed kimchi seasoning chamber temperature, and a microprocessor 300 for comparing the sensing signal value outputted from the kimchi temperature sensing unit 200 with a chaos signal value previously stored in the microprocessor 300 and controlling a cooing fan motor 12A, the kimchi seasoning heater 6 and the kimchi seasoning damper motor 16 to control the temperature of the kimchi seasoning chamber 4.

The microprocessor 300 includes an input buffer 23 adapted to temporarily store the sensing signal outputted from the ambient temperature sensing unit 100 or kimchi temperature sensing unit 200, a chaos signal pattern storing unit 33 adapted to store a chaos signal pattern corresponding to a temperature variation pattern, a control unit 53 adapted to fetch the kimchi seasoning chamber temperature sensing signal temporarily stored in the input buffer 23 and the chaos signal stored in the chaos signal pattern storing unit 33, apply the fetched signals to an operating unit 43 and control the operating unit 43 to output a control signal corresponding to the result of a comparison between the kimchi seasoning chamber temperature sensing signal and the chaos signal in the operating unit 43, and an output buffer 63 adapted to temporarily store the control signal outputted from the control unit 53.

Operation of the kimchi storage temperature apparatus having the above-mentioned construction in accordance with the present invention will now be described in conjunction with FIGS. 3 and 4.

Generally, atmospheric phenomena are known to correspond to chaos phenomena. Accordingly, such atmospheric phenomena may be analyzed by analyzing the chaos phenomena. As methods for analyzing the chaos phenomena, there are known a method for quantitatively analyzing the chaos phenomena and a method for qualitatively analyzing the chaos phenomena.

As the quantitative analysis method, there is known a method for analyzing the chaos phenomena by deriving a correlation dimension. This method provides a convenience of calculation where a variation in condition is obtained in the form of time series data by experiments.

Figure 3A:
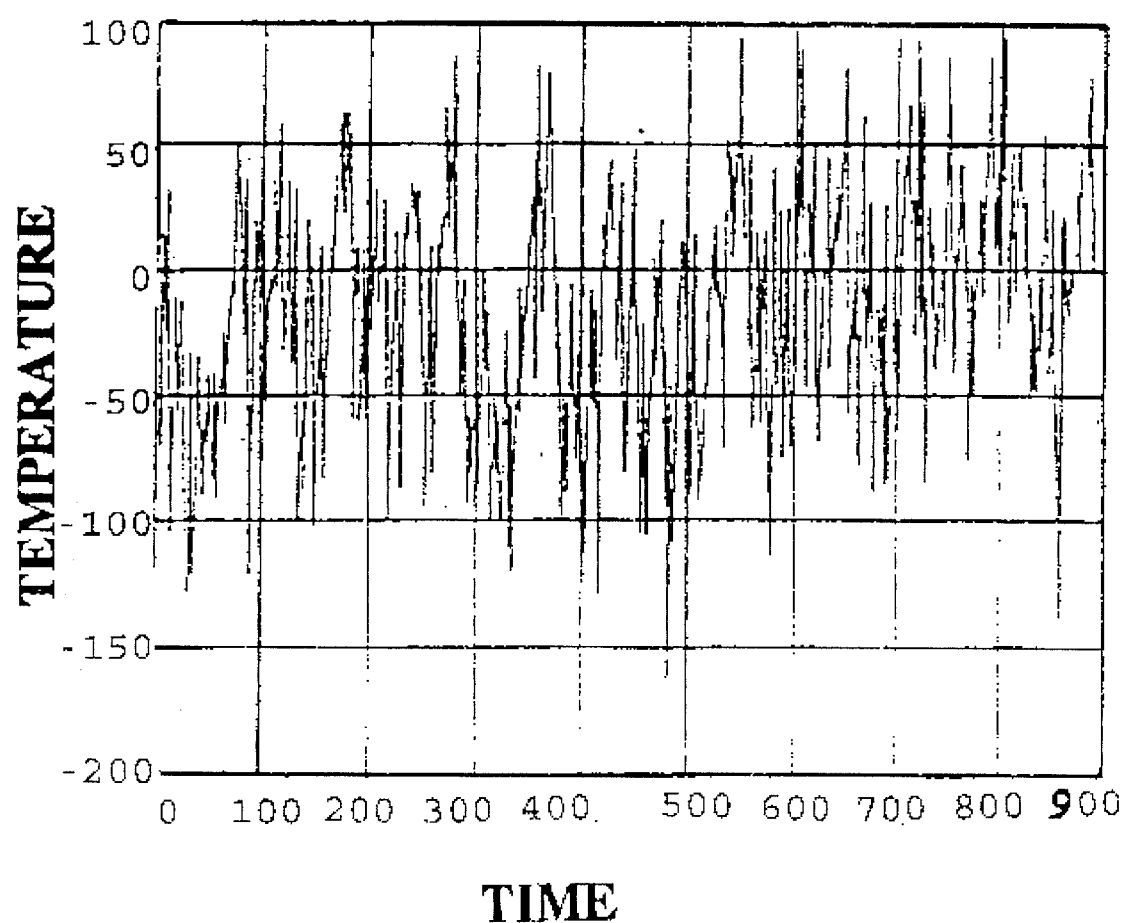
FIG. 3A is a graph illustrating a result obtained after a variation in atmospheric temperature in the winter season is quantitatively analyzed.

As the qualitative analysis method, there is known a method for re-structuring attractors.

Where a variation in atmospheric temperature in the winter season is obtained in the form of time series data by experiments, as shown in FIG. 3A, values of the obtained time series data are stored in the chaos signal pattern storing unit 33 of the microprocessor 300 in accordance with the present invention.

On the other hand, where the variation in atmospheric temperature in the winter season is derived in accordance with the method for re-structuring attractors, values resulted from the attractor re-structure are stored in the chaos signal pattern storing unit 33 of the microprocessor 300.

When a user selects a desired kimchi seasoning mode by inputting a corresponding key signal from a key input unit (not shown) under a condition that a chaos signal pattern value has previously been stored in the chaos signal pattern storing unit 33 of the microprocessor 300, the inputted key signal is applied to the control unit 53 via the input buffer 23 in the microprocessor 300.

Upon recognizing the applied key signal, the control unit 53 receives an ambient temperature sensing signal and the kimchi seasoning chamber temperature sensing signal from the input buffer 23. On the basis of the received sensing signals, the control unit 53 controls the cooling fan motor 12A, the kimchi seasoning heater 6 and the kimchi seasoning damper motor 16 to season the kimchi contained in the kimchi box 5.

After the above kimchi seasoning operation is completed, the operation mode is changed into a storage mode to carry out an operation for storing the seasoned kimchi for long time.

This operation will now be described in detail.

First, the control unit 53 of the microprocessor 300 fetches the kimchi seasoning chamber temperature sensing signal temporarily stored in the input buffer 23 and then applies the fetched sensing signal to the operating unit 43. The control unit 53 also fetches the chaos signal from the chaos signal pattern storing unit 33 and then applies the fetched chaos signal to the operating unit 43.

The operating unit 43 then compares the values of the kimchi seasoning temperature sensing signal and chaos signal applied thereto and then applies a value resulted from the comparison to the control unit 53.

As a result, the control unit 53 recognizes the comparison result value applied thereto. If the control unit 53 recognizes that the value of the kimchi seasoning chamber temperature sensing signal is more than the value of the chaos signal on the basis of the comparison result value, it controls the kimchi seasoning motor 16 to open the damper 14 and thereby decrease the temperature of the kimchi seasoning chamber 4. On the other hand, when the control unit 53 recognizes that the value of the kimchi seasoning chamber temperature sensing signal is less than the value of the chaos signal, it controls the kimchi seasoning motor 16 to close the damper 14 and thereby increase the temperature of the kimchi seasoning chamber 4.

Figure 3B:
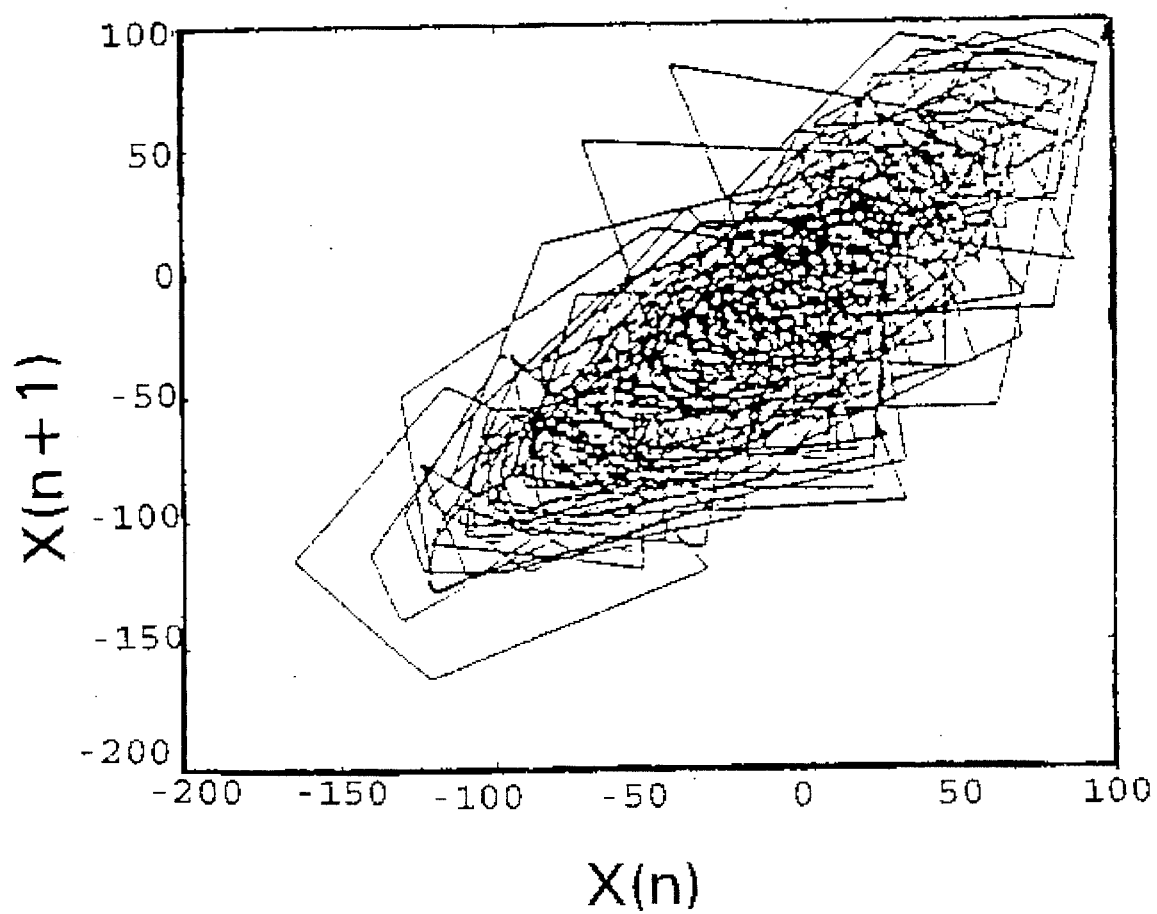
FIG. 3B is a graph illustrating a result obtained after the variation in atmospheric temperature in the winter season is qualitatively analyzed.
Figure 3C:
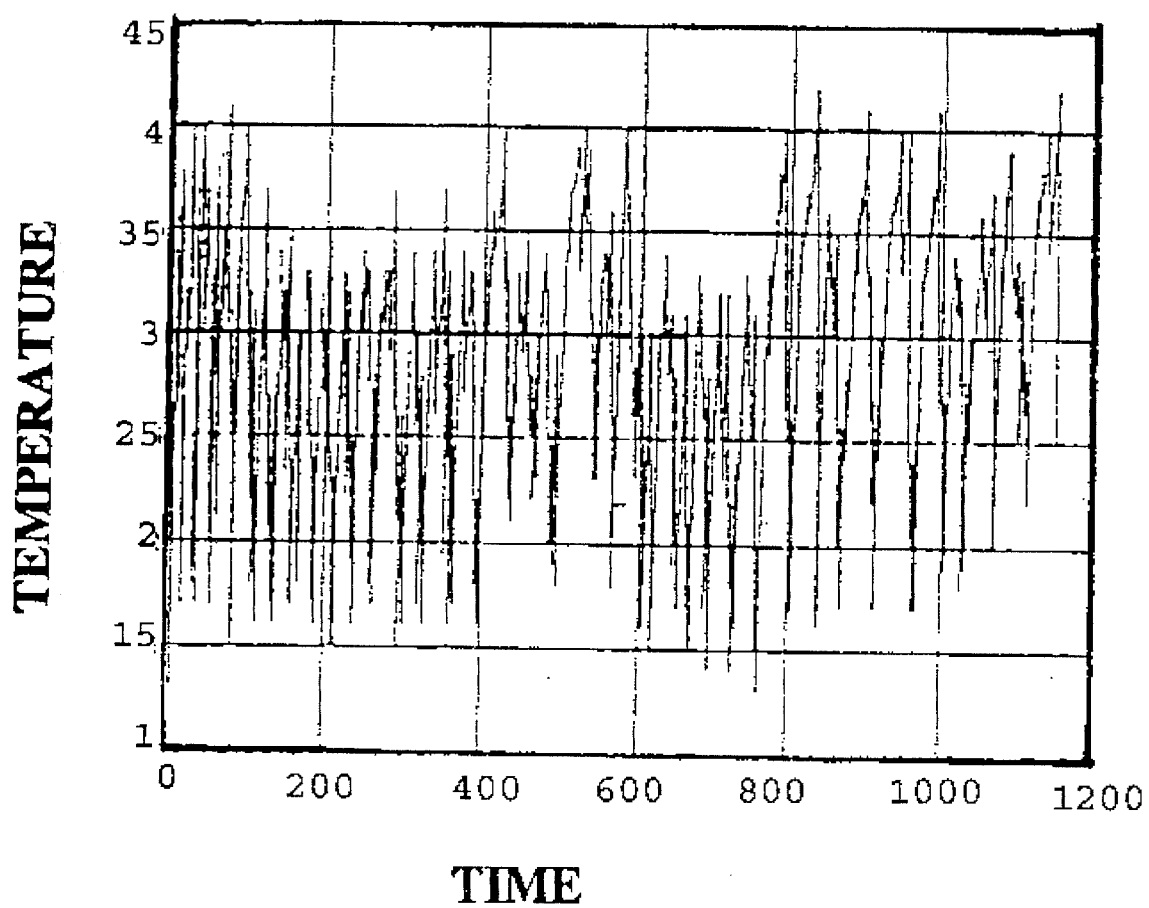
FIGS. 3C and 3D are graphs respectively illustrating a variation in temperature in a kimchi seasoning chamber in accordance with the control apparatus of FIG. 2.
Figure 3D:
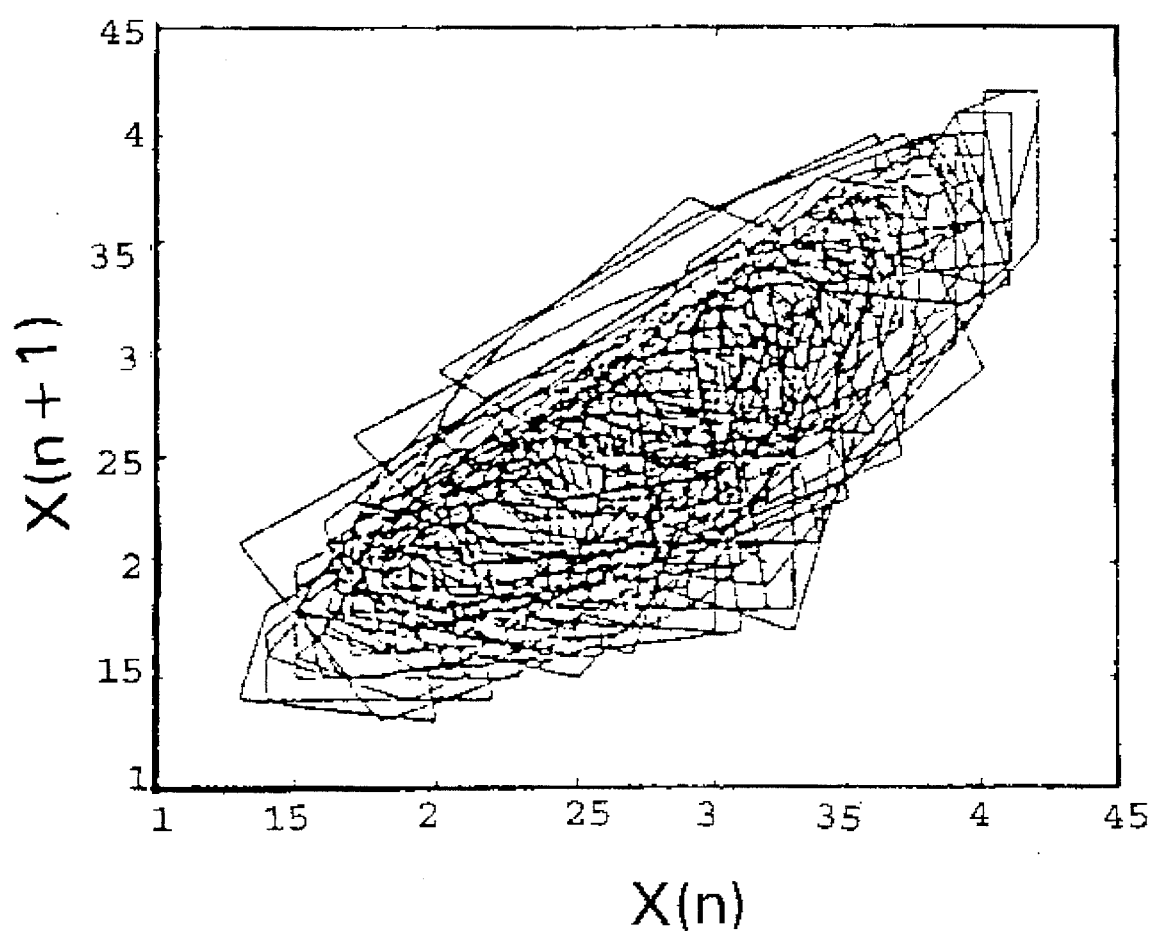

As the above operations are repeatedly carried out, the temperature of the kimchi seasoning chamber 4 varies in similar to the variation in atmospheric temperature in the winter season shown in FIG. 3A or 3B, as shown in FIG. 3C or 3D.

Figure 4:
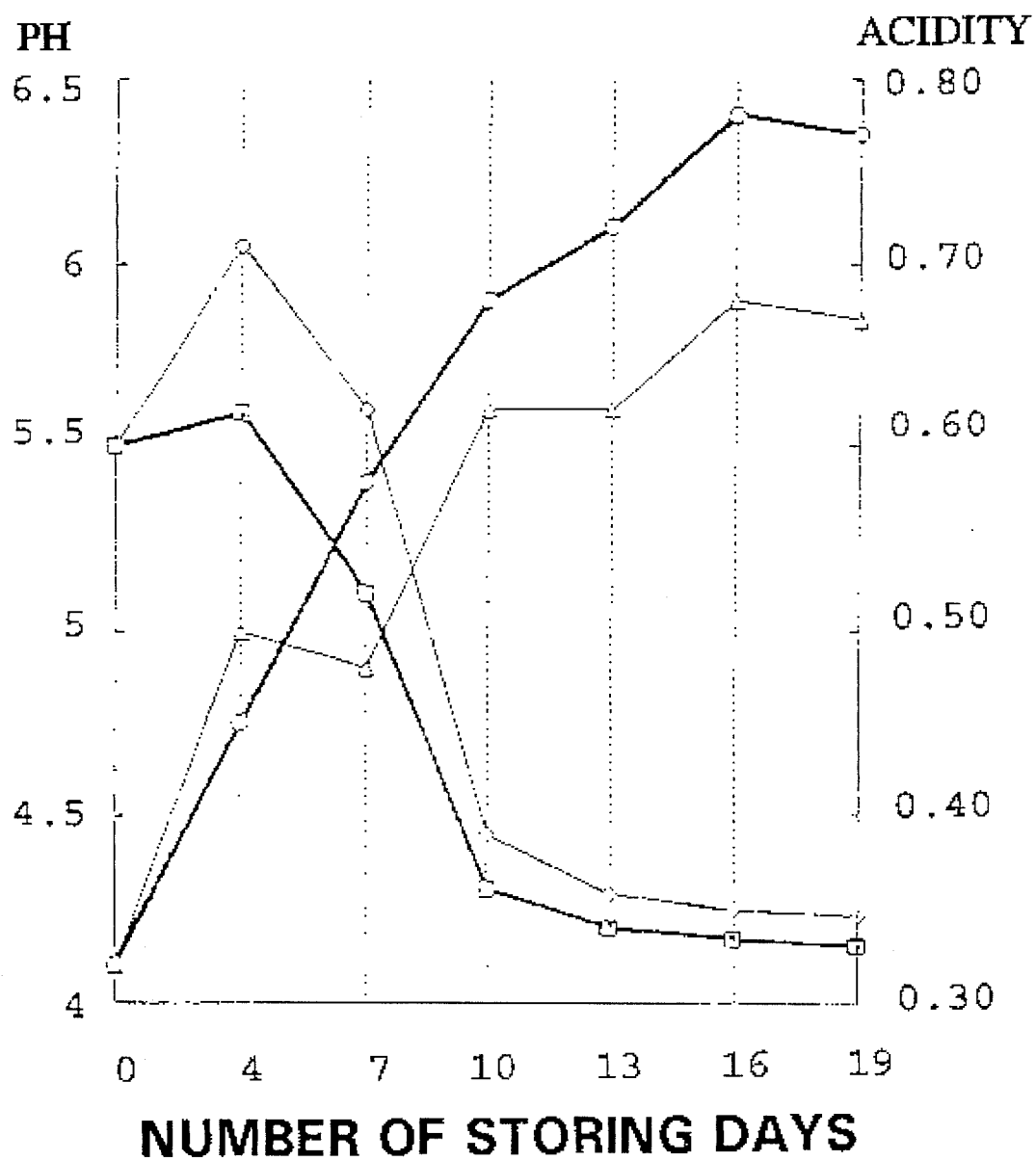
FIG. 4 shows graphs respectively illustrating pHs and acidities of a kimchi stored in the kimchi seasoning chamber in accordance with the control apparatus of the present invention and a kimchi stored in a conventional manner.

FIG. 4 shows pHs and acidities of a kimchi stored in the kimchi seasoning chamber 4 involving the variation in temperature shown in FIG. 3C or 3D in accordance with the present invention and a kimchi stored in a conventional manner. By referring to FIG. 4, it can be found that the kimchi stored in accordance with the present invention has a lower pH and a higher acidity than those of the kimchi stored in the conventional manner.

As apparent from the above description, the present invention provides an apparatus for controlling a kimchi storage temperature in a refrigerator such that its variation is similar to a variation in atmospheric temperature in the winter season, capable of achieving an improved taste of a kimchi being stored and a lengthened kimchi storage period.

In other words, the control apparatus of the present invention promotes generation and growth of pneuconostoc serving to improve the taste and perfume of kimchi while inhibiting generation and growth of lactobacillus serving to degrade the taste and perfume of kimchi and thereby provides effects of increasing the acidity of kimchi and decreasing the pH of kimchi.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a kimchi storage temperature in a refrigerator, comprising:

chaos signal pattern storing means for storing a chaos signal pattern corresponding to an atmospheric temperature variation pattern; and a microprocessor for fetching a chaos signal value previously stored in the chaos signal pattern storing means and comparing a sensing signal value indicative of a temperature of a kimchi seasoning chamber equipped in the refrigerator with the fetched chaos signal value, and controlling the kimchi seasoning chamber temperature on the basis of the result of the comparison.

* * * * *